United States Patent

[11] 3,588,821

[72] Inventors Michel Marie Joseph Lasalle
L'Haye-les-Roses;
Gerard Charles Maurice Jourdan, Paris, France

[21] Appl. No. 686,274
[22] Filed Nov. 28, 1967
[45] Patented June 28, 1971
[73] Assignee Societe Anonyme: Societe Alsacienne De Constructions Atomiques De Telecommunication Et D'Electronique (ALCATEL) Paris, France
[32] Priority Nov. 30, 1966
[33] France
[31] 85.705

[54] IMAGE CLASSIFYING BY ELEMENTAL GROUPING, READING AND COMPARING
1 Claim, 2 Drawing Figs.

[52] U.S. Cl. .................................................. 340/146.3AG
[51] Int. Cl. .................................................. G06k 9/12
[50] Field of Search .................................................. 340/146.3

[56] References Cited

UNITED STATES PATENTS

| | | | |
|---|---|---|---|
| 3,275,986 | 9/1966 | Dunn et al. .................. | 340/146.3 |
| 3,295,103 | 12/1966 | Driese et al. .................. | 340/146.3 |
| 3,446,950 | 5/1969 | King, Jr.; et al. .............. | 340/146.3X |

*Primary Examiner*—Maynard R. Wilbur
*Assistant Examiner*—Leo H. Boudreau
*Attorney*—Littlepage, Quaintance, Wray & Aisenberg

ABSTRACT: Images are classified by dividing an image into elements. Each element is associated with a photocell, and photocells are grouped in even numbers comparison half of the photocells producing a positive output, and half producing a negative output for the same illumination characteristic. Outputs of cells in the group are combined and compared with outputs of the same groups for different images in known classes. Highest comparison above a predetermined level determines classification.

Figure 1:
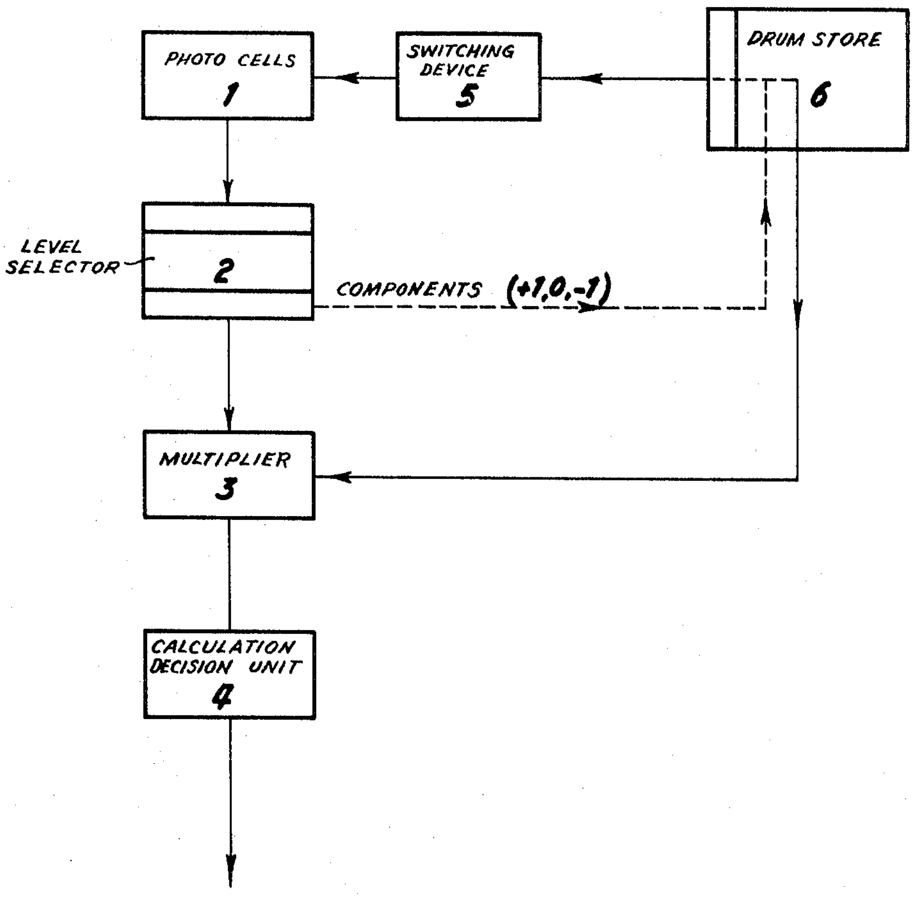

Inventors:
Michel Marie Joseph Laselle
and Gerard Charles Maurice Jourdan
By Littlepage & Quaintance
Attys Inventors:
Michel Marie Joseph Laselle
and Gérard Charles Maurice Jourdan
By Littlepage & Quaintance
Attys.

IMAGE CLASSIFYING BY ELEMENTAL GROUPING, READING AND COMPARING

For the purpose of defining the allocation of an image to a given class the "components" of said image are first determined by dividing the latter into a large number of elements each acting by its illumination on a photosensitive cell. The said cells are combined firstly in random fashion and then if required in a reprogrammed manner after examination of the result. The combination is effected in small groups each comprising an even number of cells arranged so that half of them supply a positive electric signal if they are illuminated and so that, under the same conditions of illumination, the other half supply a negative electric signal. The signals are finally combined to give a component of the image which is counted as being equal to +1, −1, or 0, depending on whether the signal exceeds a certain positive threshold, exceeds a certain negative threshold, or is situated between the two thresholds. The components are then compared successively with the profiles of the different classes previously worked out by examination of a certain number of documents for each class, the "components" of which were totalized and then if necessary levelled and stored in the memory as components addressed to each class. Comparison is made in succession with each class by making the product of the components of the image by the components of the same position of said class and then adding the terms thus obtained and finally comparing the totalized sums. The class giving the highest total is the class to which the image examined belongs if this sum exceeds a certain threshold, and said image belongs to none of the predetermined classes if this sum does not exceed said threshold.

Machines are known which have the object of classifying illuminated images by categories. In some of these machines the surface is divided into a certain number of elements, and analogue data proportional to the luminosity of each of these elements are processed. The light emitted or reflected by each element will for example be caused to act on a photoelectric detector supplying an electric current.

For the purpose of characterizing the image to be classified use is made of a certain number of these data or of a certain number of combinations (for example linear combinations) of a plurality of said data. The resulting data thus obtained may be called the "components" of the image to be classified, so that it is possible to associate a "vector" with each image, it being understood that the $n$ components of the vector are represented by the $n$ components of the image to be classified.

It has been attempted to define a vector representative of each image which is independent of certain geometrical transformations, such as translations, rotations, similitudes, and affinities. A process of this type would for example comprise representing the image to be examined by its Fourier transform (Fraunhofer diffraction pattern) or by invariant autocorrelation functions in the case of the translation of a specimen, the search for invariants in relation to other transformations leading to very complicated calculations with all the measurements (Hu's method for example).

Each category is in addition characterized by the same number of data of the same type as the preceding data. These reference data of the categories may be obtained from a standard image of each category from a batch of more or less dissimilar images, which are however indubitably grouped by category, or in more elaborate machines, known as "self-driving machines," by a process carried out with the aid of the machine itself operating on batches of images characteristic of the categories. The reference data thus obtained may be called the "weights" of the categories, because they give a data of this type more or less high relative efficiency in relation to the others; all the weights together constitute the "-profile" of the category (or class).

Recognition that an image belongs to a certain category is effected by comparing the "components" of the image to be classified with the "weights" of the categories, separately, and by allocating the image to the category which is closest in this comparison.

A known relatively simple method consists in multiplying two by two the components and weights of the same position, and making a total of the products thus obtained. The results obtained are compared with the weights of the different classes and the image is assigned to the category for which the maximum result has been obtained.

Although the principles on which such machines are based are clear and despite the fact that geometrical categories facilitating their application have been worked out and published, the choice of image components and the working out of reference weights of the categories give rise to great difficulties when the categories are not very clearly separated from one another in the sense of the aforesaid theories.

Although for example the images to be classified, while having appearances easily distinguishable to human sight and the human brain, may differ considerably from one another within the categories (for example if it is required to distinguish letters or figures by writing, position, or orientation, all of which give little difficulty to the human brain), it will be necessary to supply the machine with a very large number of components in the selection of which there would be little point in permitting guidance by considerations connected with the sensorial appearance of the images. There is then naturally a tendency to select components having a certain random character. Consequently, very complex and scarcely economic machines will be the result.

The wider the range of classifications into which it is desired that a machine should be capable of classifying images, the more complex the machine will be made by the need to deal with a very large number of components. It will for example be desired to distinguish between characters on one occasion, between photographs of machines, for example aircraft, on other occasions, and a large number of other applications could be mentioned, such as location, sorting branching, etc., in very different techniques could be mentioned.

The method of classifying images and the machine which puts said method into practice effect particularly stable identification of specimens, while tolerating relatively considerable displacements and transformations. In addition, the machine provided is capable of association with any calculating machine of the electronic type, so that direct utilization of the results which it provides is possible. Similarly, the operations of preparing the machine for carrying out its duties can easily be checked with the aid of an electronic calculating machine.

As has already been stated, the method and the machine forming the object of the present invention make it possible to effect classifications and recognitions of images in widely varying fields, such as the recognition of photographs, images, or profiles of aircraft in flight and so on, of handwritten or printed characters and figures or groups of characters and figures. Because of their simplicity the method and the machine would appear to constitute important progress in the field of reading and recognition of images by optoelectronic methods.

In the process forming the object of the present invention, for the purpose of defining the allocation of an image to a given class the "components" of said image are first determined by dividing the latter into a large number of elements each acting by its illumination on a photosensitive cell, said cells being combined firstly in random fashion and then if required in a reprogrammed manner after examination of the result, this combination being effected in small groups each comprising an even number of cells arranged so that half of them supply a positive electric signal if they are illuminated and that, under the same conditions or illumination, the other half supply a negative electric signal, said signals being finally combined to give a component of the image which will be counted as being equal to +1, −1, or 0, depending on whether the signal exceeds a certain positive threshold, exceeds a certain negative threshold, or is situated between the two thresholds; these components are then compared successively with the profiles of the different classes previously worked out by examination of a certain number of documents for each class, the "components" of which were totalized and then if necessary levelled and stored in the memory as components addressed to each class, comparison being made in succession with each class by making the product of the components of the image by the components of the same position of said class and then adding the terms thus obtained and finally comparing the totalized sums, the class giving the highest total being the class to which the image examined belongs if this sum exceeds a certain threshold and said image belonging to none of the predetermined classes if this sum does not exceed said threshold.

For better understanding of this process it appears to be necessary to give a more detailed description thereof.

The image to be analyzed is observed by means of an image analysis device according to the French Pat. application filed on the 25th Nov. 1966 by the applicants under No. PV 85,079 (Seine).

This device comprises a light transmitter bundle formed of light conductors constituted by glass fibers or glass fiber strands cooperating with a light receiver bundle likewise composed of light conductors, so as to form, in the immediate proximity of the plane of the image to be studied, a rigid block of glass fibers or glass fiber strands perpendicular to the surface of the image, the light transmitter conductors converging towards said block from a light source, while the receiving conductors diverge from said block towards a number of photosensitive cells equal to the number of glass fibers or glass fiber strands, the number of which corresponds to the desired definition of analysis of the image. The result is that said image is divided into as many elements as there are receiving glass fibre strands or photosensitive cells placed at the end of each of said strands, so that the number of elements is generally very great (several hundred) in a machine for general use. The photosensitive cells used in the present machine are photodiodes and they are combined in small groups, each of which comprises an even number of cells and each small group containing for example from 2 to 12 cells. It is obvious that in these circumstances it is possible to obtain an extremely high number of combinations, while the greater the number of cells contained in each small group the higher the number of combinations will be. Among aLl these possible combinations there are first taken at random a number equal to the desired number of "ocmponents" of the image examined, which will be of the order of several hundred in certain cases, and will amount to several thousand in other cases, depending on the type of image to be classified. In each small group of photodiodes the latter will be so arranged that half of them supply a positive electric signal if they are illuminated, while the other half supply a negative electric signal under the same conditions of illumination. There is thus obtained the "component" corresponding to this small group of cells, which component will be counted +1, −1, or 0 depending on whether the combination of signals coming from the small group of cells in question exceeds a certain positive threshold, exceeds a certain negative threshold, or is situated between the two thresholds. Thus finally the desired number of "components" of the image is obtained, each of them being +1, −1, or 0.

The "apprenticeship" of the machine is first effected. For a given class a certain number of samples belonging to that class are submitted to the machine. Examination of each sample provides a series of components of the type +1,−1;0, which are totalized in a memory as components addressed to the class in question. A profile characterizing the class in question is thus obtained in the memory addressed to that class; this profile may be considered as represented by a vector in a space having as many dimensions as there are components. The same operation is repeated for all the classes to be defined with the same number of samples. When the different profiles of the classes have been determined, two operations are carried out which particularly characterize the process claimed.

The "components" of each place of each of the classes are first compared. Whenever identical components are found for all the classes, these are eliminated and thus the necessary number of components is reduced; or else, depending on circumstances, they are replaced either by groups of cells which are no longer selected at random but are determined in dependence on the information already obtained, or by groups of cells taken at random.

A second important operation consists in verifying that the moduli of the vectors defining the profile of each class are equal or substantially close to one another. If a class exists in which the modulus of the representative vector or profile-vector is smaller than the others, further sample analysis operations will be carried out for this class and the operation will be continued until the modulus of the vector thus modified reaches the same value as the other representative vectors. If more than one class exists in which the moduli of the representative vectors differ substantially from the moduli of the other vectors, the profiles of the different classes are separately weighted by multiplying all the components of each vector by a suitable scalar.

It should be noted that these rather long operations will be effected only once on each particular machine or for each particular type of operation. The time required for these operations is amply compensated by the simplicity of construction and utilization of the machine. Finally, experience gained in the operation of machines of this type shows that it is rarely necessary to effect the weighting described above.

When the combinations of the groups of cells, which are first random combinations, have been readjusted, as described above, and when it has been made sure that the representative vectors of each class have the same modulus, it is possible to proceed to the actual utilization of the machine in its function of recognizing image classes. The sample to be classified is presented to the machine, which defines the "components" and consequently the profile-vector of said sample and compares the latter with the different classes. This comparison is made by successively forming the scalar product of the vector of said sample by the profile-vector of each class. The multiplication of the "components" of the sample by the corresponding "components" of the profile-vector of each class is thus effected, the sum of the products for each class is made, and the sums obtained are compared, the highest sum corresponding to the vector of the class nearest to the representative vector of the sample. If this sum exceeds a certain threshold corresponding to the identification the sample actually belongs to the corresponding class, and in the opposite case the sample does not form part of the classes provided.

The application of the precess described above necessitated the designing and construction of a machine according to the block diagram illustrated in FIG. 1.

It comprises in succession: an image analysis device according to the previously mentioned patent application, a drum store device 6 recording digital information and respective addresses, the store device likewise comprising reading and writing amplifiers, and a calculator unit making it possible to add numbers in the same store elements in order to constitute image components, a switching device 5 placed between the store device 6 and the image analysis device 1 and making it possible to effect groupings of cells dictated by the addresses, a level selector 2 connected to the photodiodes and receiving the information supplied by said photodiodes, said selector being in turn constituted by an adder, a differential amplifier, two reference voltage sources, a counter-subtractor, the selector 2 determining numbers −1 or 0 or +1 according to the information coming from the image analyzer 1 and delivering these numbers in digital form to the store device; a multiplier 3 connected to the selector 2 and receiving on the one hand the numbers +1; 0; −1 corresponding to determined addresses, and on the other hand the components of the profile-vector recorded in the store corresponding to the same addresses; a calculation and decision unit 4 constituted by an accumulator and a comparator, and finally by operating means comprising a control console, display devices, and a printer.

The apparatus operating by the method explained above and constructed as has just been indicated has given the Applicants full satisfaction in the course of their experiments. The background noise which may be encountered has two origins:

The first background noise is due to the dispersion in the sensitivity of the photodiodes which is inherent to the large number of cells used in a machine of this type and of very general character. Nevertheless, this background noise may be made practically negligible by preliminary sorting of the photodiodes and then by eliminating groupings having identical components in their response to the profile of all classes, as has already been stated in connection with the first operation of "apprenticeship" of the machine.

The second background noise, of random nature, is dependent on the spacing provided between the positive threshold and the negative threshold in the adjustment of the apparatus. It may be considerably reduced and made practically negligible by giving a suitable value to the level of the thresholds.

A more detailed description of a sequentially operating character recognition machine is given below by way of example of embodiment.

Figure 2:
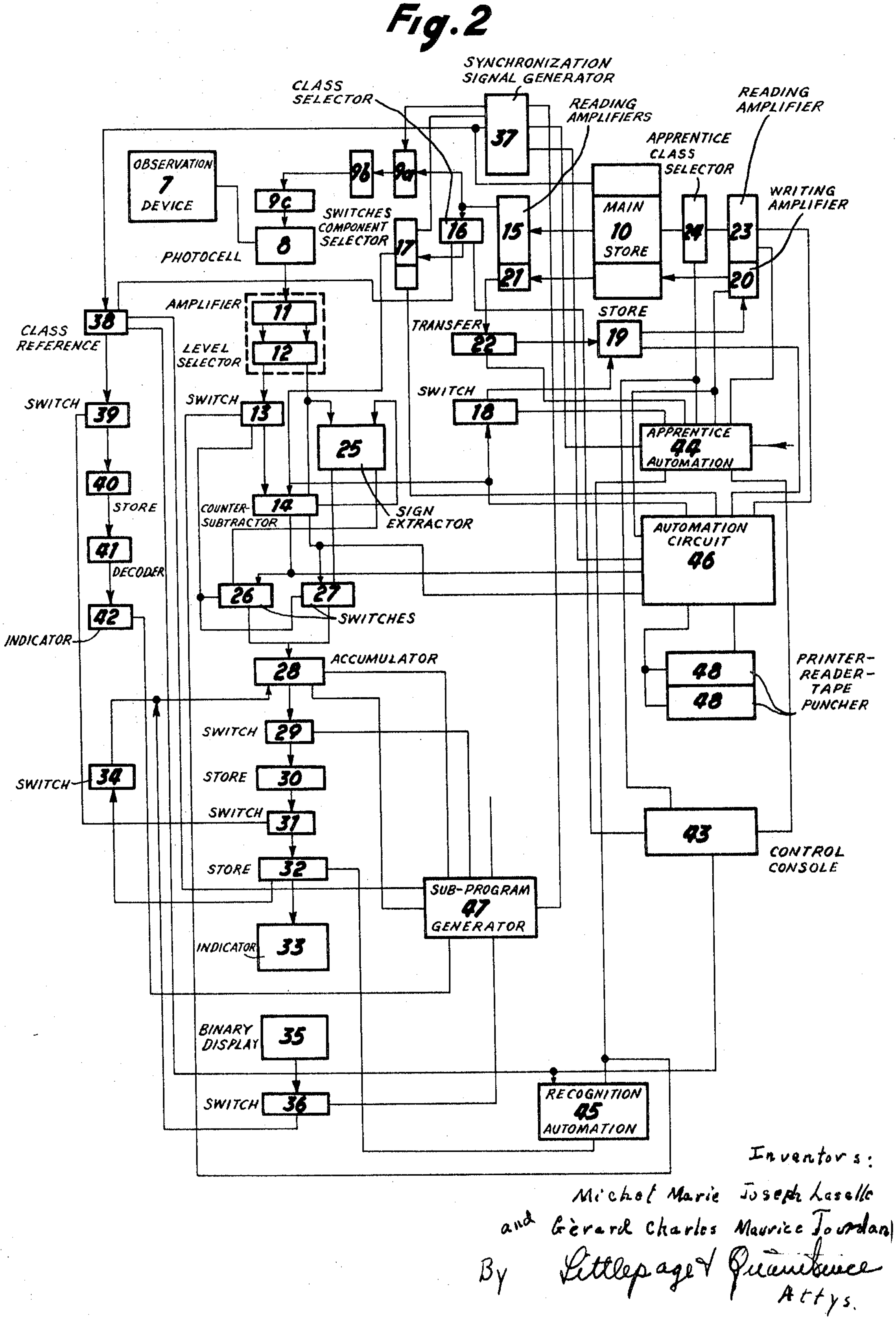

According to FIG. 2, 7 is an observation device, 8 represents the photodiodes the inputs of which are connected to the observation device, *9a*, *9b*, *9c* represent switching means which form groupings of the information coming from the photodiodes 8, 10 represents a general store device which is connected to the switching means 9, 11 is a differential amplifier which successively amplifies the information given by the photodiodes 8, 12 is a level selector which classifies the groupings of information coming from the photodiodes into three levels +1, 0, −1; 13 is a switching means which connects the output of the level selector 12 to the input of an eight-stage counter-subtractor 14, 15 is an assembly of reading amplifiers the inputs of which are connected to the store devices 10 and the output of which is connected to an input of the counter-subtractor 14 through the medium of the recognition duty class selector 16 and the component selector 17; 18 is a switch which connects the outputs of the counter-subtractor 14 to an eight-digit store 19, 20 is a group of auxiliary writing amplifiers the input of which is connected to the store 19 and the output to the auxiliary tracks of the general store device 10; 21 is a group of auxiliary reading amplifiers the output signals of which are transmitted to the store 19 by a transfer device 22. The information contained in the store 19 is then recorded in the general store 10 through the medium of the writing amplifier 23 and of the apprenticeship duty class selector 24. 25 is a device which calculates the sign of the product from the signal delivered by the level selector 12 and the component of the profile-vector which is contained in the counter-subtractor 14. 26, 27 are switches which effect the transfer of the component of the profile-vector or its complement coming from the counter-subtractor 14 to an 18-digit accumulator 28; 29 is a switch which transfers the state of the accumulator 28 to an 18-digit store 30; 31 is a switch which passes the contents of the store 30 to another 18-digit store 32; 33 is an indicator which displays the contents of the store 32; 34 is a switch which returns the contents of the store 32 to the accumulator 28; 35 is a device permitting the binary display of a number serving as comparison threshold; 36 is a switch which transmits the elements of the comparison threshold 35 to the store 28; 37 is a synchronization signal generator which receives commands from the general store device 10 and controls a class reference 38. A switch 39 transmits the contents of the class reference to a three-digit class store 40. The contents of the store 40 are decoded by the decoder 41 and displayed on the indicator 42. A control console 43 is connected to an apprenticeship automation circuit 44 and to a recognition automation circuit 45. All the elements contained in the frame 46 constitute the automation circuit connecting to the printer-reader-tape puncher system 48.

In the "apprenticeship" phase samples of a class are presented in front of the observation device 7. The photodiodes are connected in groups of 6 in accordance with a program which is defined by the addresses of the photodiodes recorded in the store device 10, information relating to this program being transmitted by the switch *9a*, *9b*, *9c*. The differential amplifier 11 successively amplifies the signals formed by 1000 groups of six diodes; in each of these groups three diodes feed one input and the other three diodes feed the other input of the differential amplifier 11, which simultaneously forms the algebraic sum of the currents of each group of six diodes. This result appears as the result of a load resistance in the form of a voltage which varies around a determined rest value. Two threshold voltages are available in the level selector 12. When the output of the differential amplifier is below the lower of these two voltages the selector supplies the signal −1. If the output voltage is between the two threshold voltages, the signal is 0. Finally, if the output voltage is higher than the higher voltage, the signal is +1.

During apprenticeship functioning, the operations therefore take place in the following manner: for a sample belonging to a determined class the following operations are carried out in succession for 1000 groupings: reading of a component of the profile-vector on the drum with the aid of the group of reading amplifiers 15; recording of this component in the counter-subtractor 14 with the aid of the class selector 16 and component selector 17; reading of the addresses of the grouping corresponding to this component, which gives rise to the control of the photodiodes; processing of the response of the level selector 12, which amounts to adding +1, 0, or −1 to the component recorded in the counter-subtractor; transfer to the eight-digit auxiliary store 19 of the result obtained in the counter-subtractor; recording on the auxiliary tracks of the general store 10 of the contents of the store 19, this operation being effected while reading and introducing into the counter-subtractor 14 the coefficient corresponding to the following grouping. When this series of operations has been completed for the 1000 groupings, the new coefficients are reentered in their original place, which necessitates 1000 times the following series of operations: reading of a coefficient on the auxiliary tracks of the general store 10 with the aid of the reading amplifiers 21; recording of this coefficient in the auxiliary store 19 by the transfer 22; reading of the coefficient in its original place with the aid of the reading amplifiers 23 and the selector 24.

These two series of operations are repeated as many times as there are samples in a class. When all the samples of a class have been studied, the apprenticeship is completed; the same procedure is carried out in succession for the six classes studied by the machine given as an example. The sequence of the various apprenticeship operations is organized by the apprenticeship automation system 44.

The tape punching and reading device makes it possible, through the medium of the connection automation system 46, to have access to the central store and to modify elements therein or extract elements therefrom under the control of a human operator or of an outside electronic calculator. It is thus easily possible for example to modify certain small groups of cells producing the components of the image and selected at random or in dependence on the information already obtained.

During recognition functioning, groupings of photodiodes are made in the same manner as for the apprenticeship, and the level selector 12 likewise supplies the values (−1; 0; +1) corresponding to each grouping. The following operations are effected in succession for the 1000 groupings corresponding to a class; reading of a coefficient on the general store 10 with the aid of the group of amplifiers 15 and transfer thereof to the counter-subtractor 14 which serves as store; reading of the addresses of the grouping corresponding to this coefficient, which gives rise to the control of the photodiodes; processing of the response of the level selector 12 with the aid of the sign and instruction calculator 25, which determines the transformations to be made to the coefficient to be introduced into the accumulator 28 (the operation carried out being equivalent to the algebraic product of the coefficient by the response of the level selector 12); introduction of the result into the accumulator 28, which adds the 1000 successive results and retains the final total in store; transfer of this total, if it is positive, to the store 50; when this first phase, which will be the same for each class (selection by classes of the coefficients being made automatically from the class counter 38) has been completed, the six totals are compared together, proceeding as follows in succession for the six class: comparison of the two positive totals obtained successively; transfer to the store 32 of the higher total; parallel evolution of the store 40 which after each comparison retains the number of the class of the highest total; comparison of the highest total with the threshold 35; processing of this comparison which, depending on whether or not the total is higher than the threshold, consists in permitting the display of the corresponding class or the display of nonrecognition of the indicator 42. The operations of this second phase are organized by the subprogram generator 47. All the recognition operations are placed in sequence with the aid of the recognition automatic system 45.

An example of the well known prior art optical readers or pattern recognition devices is found in U.S. Pat. No. 3,295,103. Many of the elements of the present invention are similar to elements found in that patent, and for convenience, reference may be had to the following cross-referral guides. The level selectors 2 and 12 of the present case are similar to the decision cells of the patent. The class selector and component selector are simply store-addressing devices which pick the proper unit. The apprenticeship duty class selector 24 is simply a memory addressing device which is used to enter the digital information in the memory in conjunction with the writing amplifier. Convenient apparatus, for example, devices shown in FIG. 5 of the reference patent, may be employed. The class reference device 38 is unnecessary to the invention. It simply is a rocker or cradle register which momentarily contains the number of the class in the course of treatment.

Any convenient control console may be used. The apprentice automation circuit 44 is simply a collective identification of the circuits used in the learning step or the imparting of units to the memory. Circuits, for example as shown in FIG. 5 of the reference patent, may be used.

Apprentice automation circuit 44 and recognition automation circuit 45 are simply collective names and identification for well known circuits that put the equipment in one or two modes of operation, the learning or apprenticeship mode or the recognition-reading mode. When one is on, the other is off. Primarily, each of these circuits is simply a series of connectors. The relationships of these circuits with the other elements of the apparatus is that which is important in the present invention. That is shown with reference to FIG. 2 and the foregoing description. The automation circuit is simply that well known circuit that is always used with computers and storage is to extract information from the storage and provide the information to the printer reader or tape puncher which is identified as 48 in the present drawing.

Subprogram generator 47 is a well known sequencing device which converts the keying synch signal into the appropriate controls for the switches, as shown in FIG. 2. Sign extractors are well known in the prior art, for example the D cells of the cited patent. Synchronization signal generators, such as 37, are well known for providing the heart beat of any system, synchronizing the various elements as shown by the connections in FIG. 2 and as described in the above description.

We claim:

1. An electronic image classification apparatus comprising: an optical reader comprising a multiplicity of photosensitive cells, means for projecting an image to be classified on said photosensitive cells, address storage means for storing and grouping addresses of the photosensitive cells in small groups, each group comprising an even number of cells arranged so that half of them supply a positive electric signal if they are illuminated and that, under the same conditions of illumination, the other half supply a negative electric signal, switching means connected to the address storage means and to the photosensitive cells for activating the groups of cells indicated by the address, means for combining outputs of the photosensitive cells in each group, and means for generating from each combination of grouped cell outputs a positive, negative, or a zero signal, a store arranged to record and retain the indications resulting from previous signals produced in the course of apprenticeship readings of reference images, means for effecting the application of the signals thus retained by said store to a comparator, means for applying signals produced in the course of a recognition reading to said comparator which then compares them with the signals supplied by the store, and means for classifying the image according to results of the comparison.